C. H. RUSSELL.
AUTOMATIC CLEANER FOR PUSH RAKES.
APPLICATION FILED JULY 21, 1908.
914,517.
Patented Mar. 9, 1909.
2 SHEETS—SHEET 1.
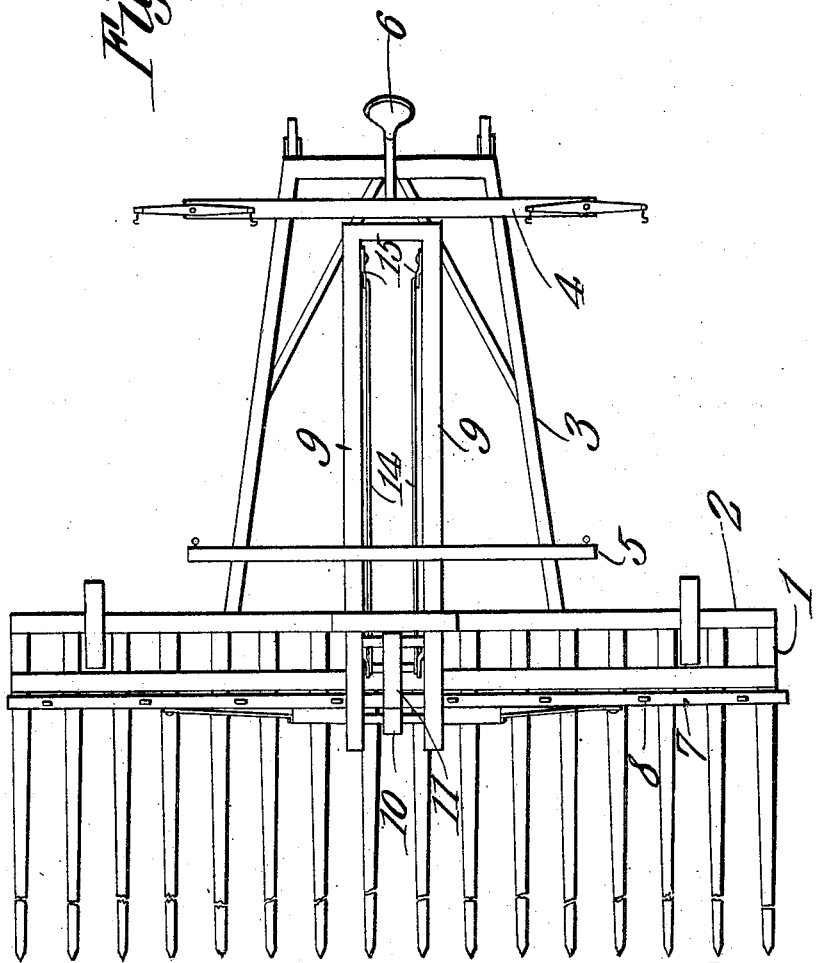

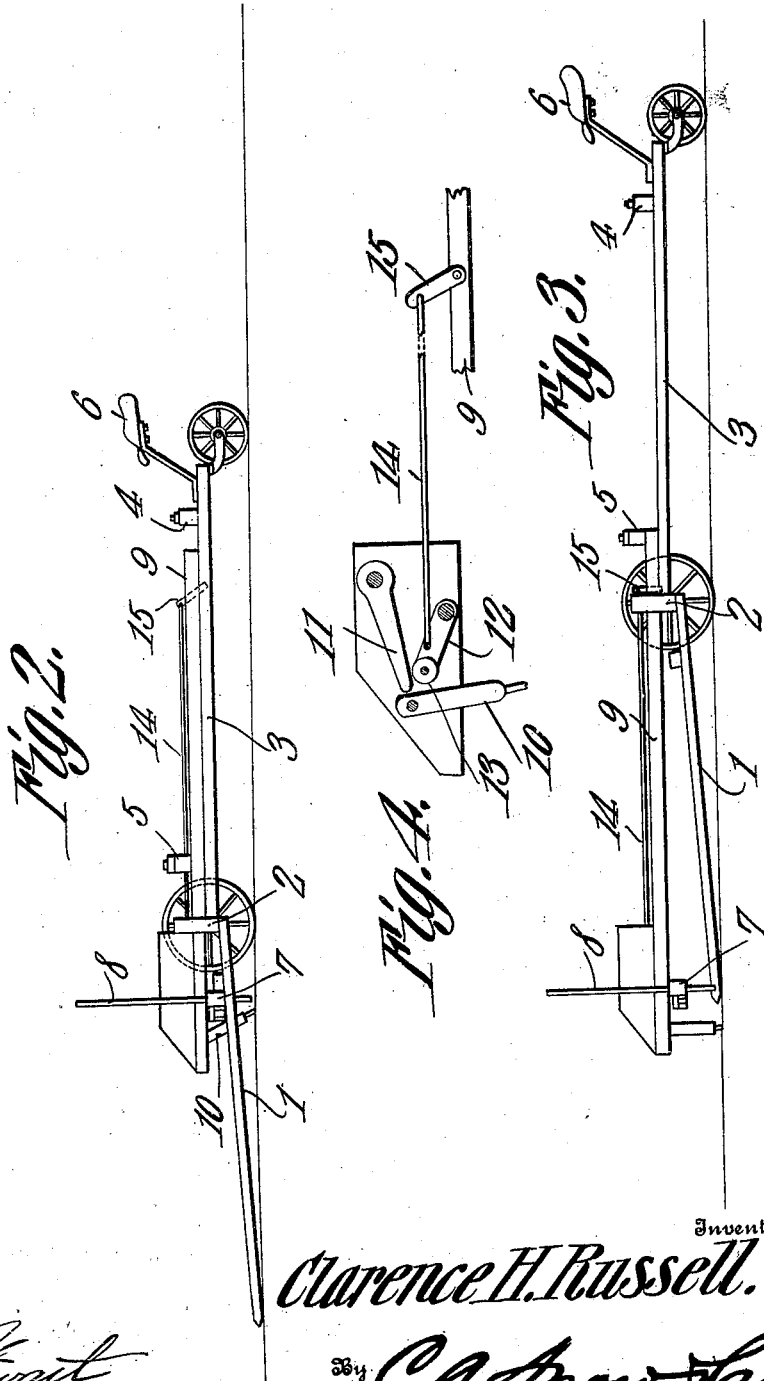

UNITED STATES PATENT OFFICE.

CLARENCE H. RUSSELL, OF TORRINGTON, WYOMING.

AUTOMATIC CLEANER FOR PUSH-RAKES.

No. 914,517.        Specification of Letters Patent.        Patented March 9, 1909.

Application filed July 21, 1908. Serial No. 444,655.

*To all whom it may concern:*

Be it known that I, CLARENCE H. RUSSELL, a citizen of the United States, residing at Torrington, in the county of Laramie and State of Wyoming, have invented a new and useful Automatic Cleaner for Push-Rakes, of which the following is a specification.

This invention has relation to automatic cleaners for push rakes and it consists in the novel construction and arrangement of its parts as hereinafter shown and described.

The object of the invention is to provide a cleaner which is adapted to be automatically operated by the movement of the rake for the purpose of removing the hay from the rake when the rake is being backed, and also for the purpose of drawing the said cleaner back upon the rake when the rake is moving in a straight forward direction.

In the accompanying drawings, Figure 1 is a top plan view of a rake with the automatic cleaner applied thereto. Fig. 2 is a side elevation of a rake showing the cleaner in its normal position thereon. Fig. 3 is a side elevation of a rake showing the cleaner in position when about completing the act of cleaning the material from the rake, and Fig. 4 is a side elevation of the earth engaging member carried by the cleaner and the part for operating the said member.

As above stated the automatic cleaner is adapted to be used in connection with a push rake of ordinary construction. Such rakes usually consist of a series of tines 1 which are mounted upon a frame 2. The draft frame 3 is located in the rear of the frame 2 and is provided with a double tree 4 and a hold-back bar 5. The operator's seat 6 is mounted on the frame 3 at any suitable point.

The cleaner consists of the bar 7 which is adapted to rest upon the tines 1 and move longitudinally along the same. The upright arms 8 are mounted at suitable intervals upon the bar 7. The forward ends of the beams 9 are attached or suitably connected with the bar 7, and the said beams 9 extend back over the frame 3 of the rake proper. The said beams 9 are spaced apart and are in parallel relation and the anchor 10 is pivotally mounted between the forward end portions of the said beams. The said anchor 10 is in the form of a lever with its shorter end uppermost. The pawl 11 is also pivotally mounted between the beams 9 and at its forward end is adapted to engage the shorter ends of the anchor 10. The lifter 12 is also pivotally mounted in the space between the forward end portions of the beam 9 and is provided at its free end with a friction roller 13 which is adapted to engage the under side of the pawl 11. The cables 14 are attached at their forward ends to the lifter 12 and at their rear ends to the levers 15 which are fulcrumed to the inner sides of the beams 9.

The operation of the cleaner is as follows: When the rake is moving in a straightforward direction the bar 7 is normally as illustrated in Fig. 1 of the drawing. As the hay is accumulated upon the tines 1 of the rake, the said bar 7 is held in the said position as shown, and when the rake is moved to a place where it is desired to remove the hay therefrom, the operator backs the draft animals which are attached to the rake and consequently the rake is pulled back. At the same time the lower pointed end of the anchor 10 engages the ground, and the beams 9 are held against longitudinal movement. Consequently the bar 7 and the arms 8 are held in fixed position, and as the said bar 7 and arms 8 are behind the hay and the rake is retreating from under the same, the hay is pushed off or beyond the forward pointed ends of the tines 1. When the frame 2 of the body of the rake moves back and comes in contact with the lever 15, the cables become taut and the lifter 12 is swung upon its pivot and the free end of the pawl 11 is lifted up or beyond the path of movement of the shorter end of the anchor 10. Consequently the said anchor 10 can swing upon its pivot and the anchor will move from the position as shown in Fig. 4 of the drawings, into a position substantially in alinement with the tines 1 of the rake. Consequently the pointed end of the anchor 10 will disengage the surface of the ground and the beams 9 and their attachments will move back together with the rake. Thus it will be seen that any material carried upon the tines 1 will be forced from the same. When the rake has been sufficiently backed and the operator starts the draft animals in the straightforward direction the pointed end of the anchor 10 will again engage the surface of the ground and hold the beams 9 and their attachments substantially in fixed position while the tines 1 are moving longitudinally under the cross bar 7 of the cleaner. When the said cross bar 7 comes in contact with the frame 2 of the rake, the anchor 10 and the adjacent parts are moved back into the position as shown in Fig. 4 of the drawings, when the said anchor again becomes disengaged from the surface of the ground and the beams 9 and their attachments move bodily with the rake.

Having thus described my invention what I claim as new and desire to secure by Letters Patent is:—

1. In combination with a rake, a cleaner comprising a frame and a beam adapted to move longitudinally along the rake tines, an anchor pivotally connected to the beam, a pawl pivotally connected to the beam and adapted to engage the anchor, a lifter pivotally connected to the beam and adapted to engage the pawl, a lever fulcrumed to the beam, a cable connecting said lever with the lifter, said lever being in the path of movement of the rake frame.

2. In combination with a rake, a cleaner comprising a frame and a beam adapted to move longitudinally of the rake tines, an anchor pivoted to the cleaner and being located between the rake tines, a pawl pivoted to the cleaner and having a free end located in the path of movement of one end of the anchor, a lifter pivoted to the cleaner and having a free end located in the path of movement of the pawl, a lever fulcrumed to the beam and being located in the path of movement of the rake frame, and a cable connecting the lever with the lifter.

3. In combination with a rake, a cleaner comprising a frame and beams adapted to move longitudinally of the rake tines, an anchor pivoted to the beams and being located between the rake tines, a pawl pivoted to the beams and having a free end located in the path of movement of one end of the anchor, a lifter pivoted to the beams and having a free end located in the path of movement of the pawl, levers fulcrumed to the beams and being located in the path of movement of the rake frame and cables connecting the levers with the lifter.

In testimony that I claim the foregoing as my own, I have hereto affixed my signature in the presence of two witnesses.

CLARENCE H. RUSSELL.

Witnesses:
JOHN T. McDONALD,
ANNA McDONALD.